July 30, 1963  A. LEGER, JR  3,099,792

HALL EFFECT ELECTRICAL APPARATUS

Filed Nov. 13, 1959

*INVENTOR.*
ALTON LEGER, JR.

BY Arthur H. Swanson

ATTORNEY.

United States Patent Office 3,099,792
Patented July 30, 1963

3,099,792
HALL EFFECT ELECTRICAL APPARATUS
Alton Leger, Jr., Hatboro, Pa., assignor to Minneapolis-Honeywell Regulator Company, Minneapolis, Minn., a corporation of Delaware
Filed Nov. 13, 1959, Ser. No. 852,840
3 Claims. (Cl. 323—94)

This invention relates to electrical apparatus. More specifically, the present invention relates to Hall-voltage generators.

An object of the present invention is to provide a Hall-voltage generator having an improved response characteristic.

A Hall-voltage generator commonly comprises a semiconducting body traversed by an electrical current and subjected to a magnetic field transverse to the direction of current flow. A pair of electrodes are spaced on the semiconducting body in a direction transverse to the current flow and the magnetic field. This combination is effective to produce the so-called Hall-voltage across the aforesaid electrodes.

The Hall-voltage is dependent on the magnitude of the magnetic field and the applied electrical current. The Hall-voltage generator is usually characterized by a limited high-frequency response to an input signal applied as a varying magnetic field owing to the reactive effect of the magnetic structure.

Accordingly, another object of the present invention is to provide a Hall-voltage generator, with an electromagnetic input circuit, which generator is characterized by an improved high-frequency response.

In accomplishing these and other objects, there has been provided, in accordance with the present invention, a Hall-voltage generator having a pair of Hall-voltage signal electrodes. A second pair of signal electrodes are provided on the Hall-voltage generator to define a constant-current path through the Hall-voltage generator. A first magnetic field winding is arranged to provide a magnetic field, corresponding to an input signal, having a component transverse to the current path and to an axis defined by the Hall-voltage signal electrodes. A second magnetic field winding is arranged in magnetic association with the first field winding and is serially connected with the Hall-voltage signal electrodes. The magnetic field is effective to produce a signal on the Hall-voltage electrodes and a signal across the second field winding representing a first and a second constituent of an output signal, respectively. The output signal corresponding to the aforesaid input signal is the cumulative summation of these first and second constituents.

A better understanding of the present invention may be had from the following detailed description when read in connection with the accompanying drawings, in which:

FIG. 2b is a representation of the waveshapes representative of the signals occurring in the circuit of FIG. 2a.

Figure 1A:
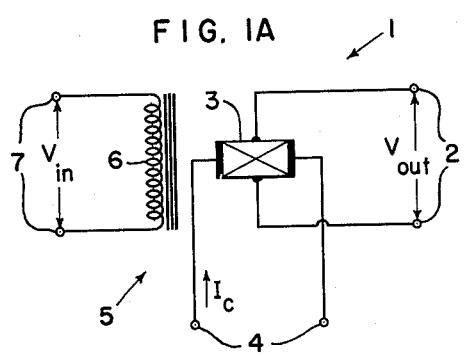
FIG. 1a is a schematic representation of a prior art Hall-voltage generator.

Referring to FIG. 1a in more detail, there is shown a Hall-voltage generator 1 having a pair of Hall-voltage signal terminals, hereinafter referred to as Hall-electrodes, 2. The Hall-electrodes 2 are connected to a Hall-plate 3 comprising a semi-conducting substance such as indium antimonide. A pair of constant-current terminals 4 are provided on the Hall-plate 3 for connection to a constant-current source. A magnetic structure 5 is positioned in magnetic association with the Hall-plate 3 to provide a magnetic field across the Hall-plate 3. A magnetic field winding 6 of the aforesaid magnetic structure is connected to a pair of input-signal terminals 7.

Figure 1B:
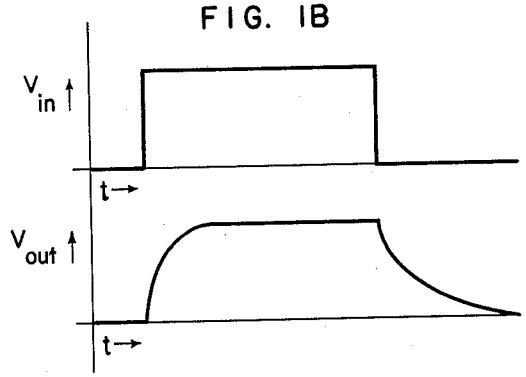
FIG. 1b is a representation of the waveshapes representative of the signals occurring in the circuit of FIG. 1a, FIG. 2a is a schematic representation of a Hall-voltage generator embodying the present invention.

The mode of operation of the device shown in FIG. 1a follows:

Assume the input signal terminals 7 are connected to an input signal source, and a suitable constant-current is applied to the constant-current terminals 4. The Hall-effect upon which the operation of the Hall-voltage generator 1 depends is well-known in the art. Briefly, the input signal applied to the input terminals 7 is effective to produce a magnetic field through the Hall-plate 3. The magnetic field, in turn, is effective to deflect the electrons comprising the aforesaid constant-current in the Hall-plate 3. This deflection of the constant-current electrons is proportional to the strength of the magnetic field and is directed toward one or the other of the Hall-electrodes 2 depending on the polarity of the magnetic field. The end result of this electron deflection is to create a potential difference, or Hall voltage, across the Hall-electrodes 2. The polarity and amplitude of this Hall voltage is directly dependent on the polarity and strength of the applied magnetic field, respectively, at any preselected constant-current level. It has been found that the semiconductor material of the Hall-plate 3 is responsive to alternating magnetic field input signals having a frequency range extending into the region of micro-waves; e.g., $10^{11}$ cycles per second. However, the limiting element in the frequency-response of the Hall voltage generator shown in FIG. 1a is the magnetic structure 5. In order to achieve a suitable magnetic field strength, the magnetic field winding 6 usually comprises a coil of wire having a large number of turns wound on a ferrous core structure. Accordingly, an input signal applied to the input terminals 7 having a high frequency component is distorted by the high inductive reactance of the magnetic structure 5. Thus, the magnetic field applied to the Hall-plate 3 is effective to produce a Hall-voltage which is not an accurate reprodution of the aforesaid input signal. For example, the waveshapes shown in FIG. 1b represent corresponding input and output signals appearing in the circuit shown in FIG. 1a. The waveshape labeled "$V_{in}$" is applied to the input terminals 7. This waveshape is a so-called square wave having high and low frequency components. The waveshape labelel "$V_{out}$" is the corresponding output Hall-voltage appearing at the Hall-electrodes 2. The shape of the leading and trailing edges of the output Hall-voltage is the result of the effect of the inductive reactance of the magnetic structure 5. The Hall-generator shown in FIG. 1a, consequently, is not capable of faithful following a high frequency input signal.

Figure 2A:
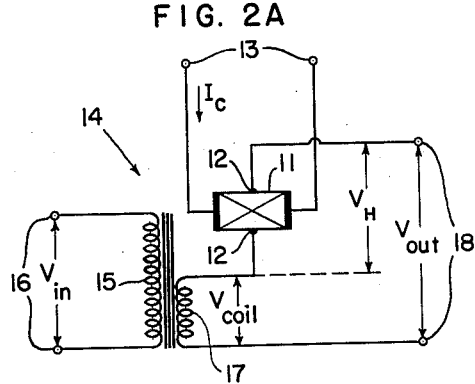

The circuit shown in FIG. 2a is a schematic representation of the structure of the present invention. As shown therein, there is provided a Hall-plate 11 having a pair of Hall-electrodes 12 and a pair of constant-current terminals 13. A magnetic structure 14, including a first magnetic field winding 15, is provided for applying a magnetic field through the Hall-plate 11. A pair of input terminals 16 are provided for applying an input signal to the field winding 15. A second winding 17 is positioned in magnetic association with the first magnetic field winding 15. A pair of output-signal terminals 18 are provided for connection to a subsequent utilization device. The second winding 17 is serially connected between one of the Hall-electrodes 12 and one of the output-signal terminals 18. The other output-signal terminal 18 is directly connected to the other of the Hall-electrodes 2.

Figure 2B:
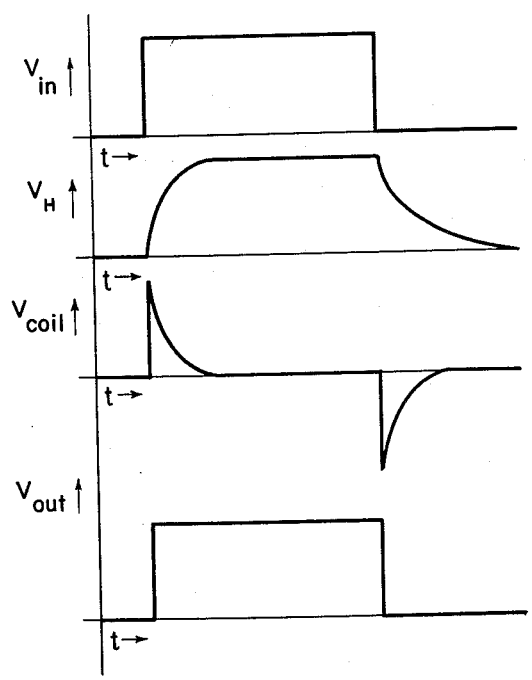

The operation of device shown in FIG. 2a is similar to the previously discussed operation of the device shown in FIG. 1a with the additional effect of the second winding 17. Thus, the circuit waveshapes of FIG. 2a, shown in FIG. 2b, labeled "$V_{in}$" and "$V_H$" are duplicates of the waveshapes "$V_{in}$" and "$V_{out}$," shown in FIG. 1a, respectively. The waveshape of FIG. 2b labeled "$V_{coil}$" is the resultant signal appearing across the second winding 17 with the applied square wave input signal. This waveshape; i.e., "$V_{coil}$," is a typical transformer output signal resulting from an applied square wave input signal. The aforesaid series connection of the second winding 17 with one of the Hall electrodes 12 is effective to produce an output signal at the output terminals 18 which is the cumulative effect of the Hall-voltage signal and a second winding signal. Accordingly, the summation of the waveshapes labeled "$V_H$" and "$V_{coil}$" is effective to produce the waveshape labeled "$V_{out}$" at the output terminals 18. This waveshape is a faithful reproduction of the input square wave as a result of the compensating effect of the waveshape labeled "$V_{coil}$" on the waveshape labeled "$V_H$."

Thus, it may be seen that there has been provided, in accordance with the present invention, an improved Hall-voltage generator having an electro-magnetc input circuit which generator is characterized by an extended high frequency response.

What is claimed is:

1. A Hall-voltage generator comprising a semiconductor plate means, a first pair of electrodes on said plate means for connection to a constant-current source, said first pair of electrodes defining a current path through said plate means, a second pair of electrodes on said plate means, said second pair of electrodes being spaced on said plate means to define an axis through said plate means transverse to said current path, a magnetic-field producing means, said magnetic-field producing means being arranged to provide a magnetic-field component transverse to said path and to said axis within said plate means, means for connecting said magnetic-field producing means to an input-signal source, a magnetic-field responsive means arranged in a magnetic field associaiton with said field producing means to derive from said magnetic-field producing means a magnetically induced responsive means output signal representative of an input signal applied to said magnetic-field producing means, a pair of output-signal terminals, means connecting said responsive means between one of said output-signal terminals and one of said second pair of electrodes, and means connecting the other of said output-signal terminals with the other one of said second pair of electrodes.

2. A Hall-voltage generator comprising a semiconductor plate means, a first pair of electrodes on said plate means for connection to a constant-current source, said first pair of electrodes defining a current path through said plate means, a second pair of electrodes on said plate means, said second pair of electrodes being spaced on said plate means to define an axis through said plate means transverse to said current path, a first magnetic field winding for providing a magnetic field through said plate means having a component transverse to said axis and to said path, means for connecting said last-mentioned means to an input signal source, a magnetic-field responsive means arranged in magnetic-field association with said field producing means, said responsive means comprising a second magnet-field winding arranged to derive from said first winding a magnetically induced second winding output signal representative of an input signal applied to said first winding, a pair of output-signal terminals, means connecting said responsive means between one of said output-signal terminals and one of said second pair of electrodes, and means connecting the other of said output-signal terminals with the other one of said second pair of electrodes.

3. A Hall-voltage generator comprising a semiconductor plate means, a first pair of electrodes on said plate means for connection to a constant-current source, said first pair of electrodes defining a current path through said plate means, a second pair of electrodes spaced on said plate means to define an axis through said plate means transverse to said current path, input signal responsive means for providing a magnetic field through said plate means having a component transverse to said axis and to said path, said magnetic field being effective to produce a Hall-voltage on said second pair of electrodes as a first constituent of an output signal, magnetic field responsive means arranged in magnetic field association with said magnetic field from said input signal responsive means to derive from said input signal responsive means a second constituent of an output signal across said field responsive means representative of an input signal applied to said input signal responsive means, and means serially connecting said responsive means with said second pair of electrodes to form an output signal from the cumulative sum of said first and said second constituents.

References Cited in the file of this patent
UNITED STATES PATENTS

| | | |
|---|---|---|
| 1,778,796 | Craig | Oct. 21, 1930 |
| 2,964,738 | Barney et al. | Dec. 13, 1960 |
| 2,988,707 | Kuhrt et al. | June 13, 1961 |